United States Patent Office 3,438,638
Patented Apr. 15, 1969

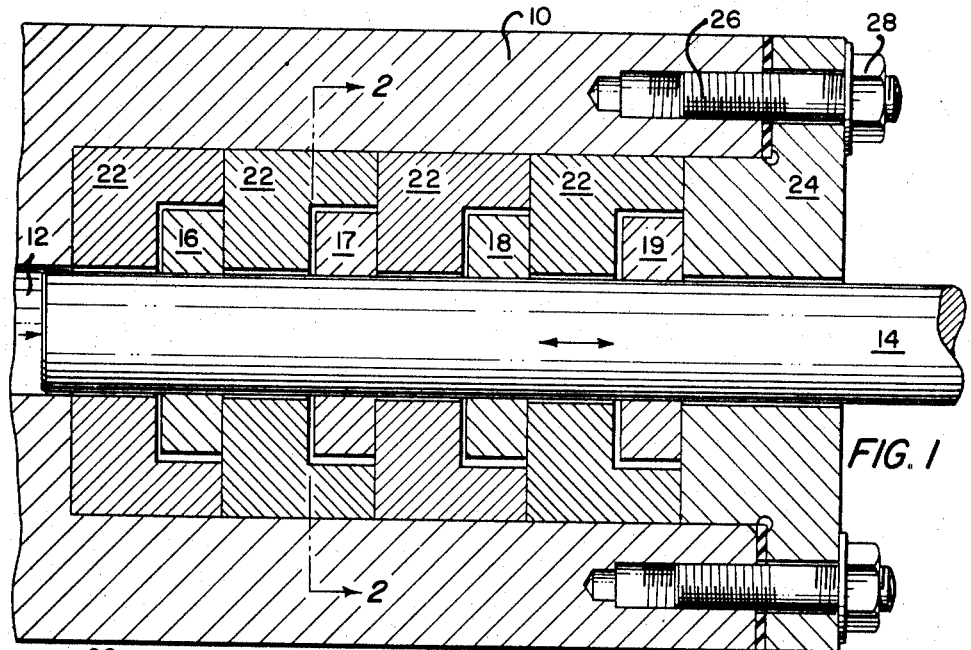
FIG. 1
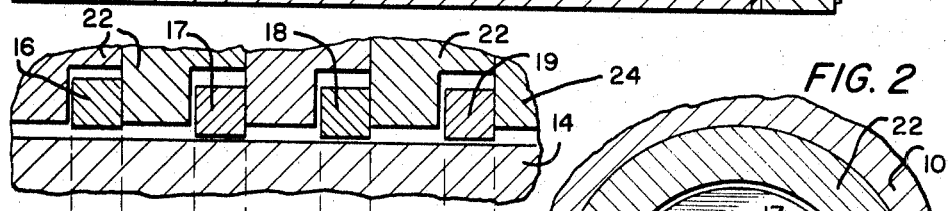
FIG. 2
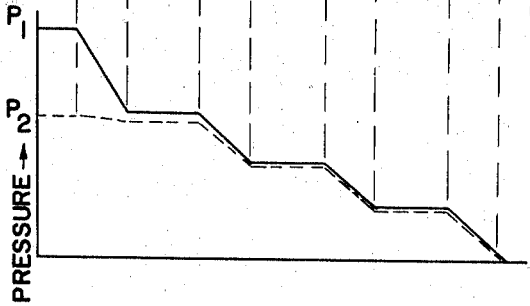
FIG. 3
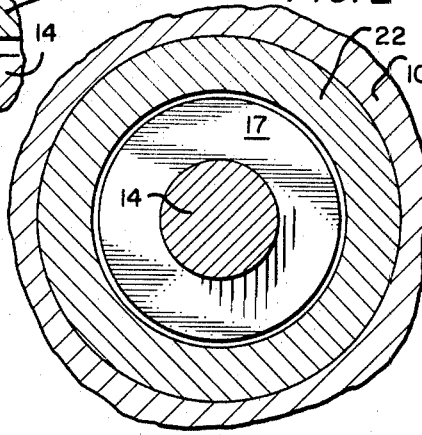
INVENTORS
WALLACE K. NEWCOMB
CHARLES E. BLANK, SR.
DONALD F. VANLOON
BY
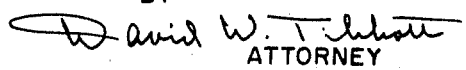
ATTORNEY INVENTORS
WALLACE K. NEWCOMB
CHARLES E. BLANK, SR.
DONALD F. VANLOON
BY
David W. Tillotson
ATTORNEY

3,438,638
METALLIC PACKING
Wallace K. Newcomb, Charles E. Blank, Sr., and Donald F. Van Loon, Painted Post, N.Y., assignors to Ingersoll-Rand Company, New York, N.Y., a corporation of New Jersey
Application Sept. 15, 1966, Ser. No. 579,615, now Patent No. 3,348,849, dated Oct. 24, 1967, which is a continuation-in-part of application Ser. 313,878, Oct. 4, 1963. Divided and this application Aug. 28, 1967, Ser. No. 705,866
Int. Cl. F16d 17/00; F16j 15/40
U.S. Cl. 277—27                      2 Claims

ABSTRACT OF THE DISCLOSURE

A reciprocating rod packing comprising a plurality of metal rings circling the rod and arranged with a predetermined clearance between themselves and the rod. The rings are made of a very strong metallic material and are dimensioned to contract under pressure to nearly close their clearances during operation of the rod. At least one of the rings is arranged to have a greater clearance on the rod than the clearances provided by the other rings.

---

This invention relates to reciprocating compressors or pumps and more particularly to a dynamic elastically deflectable seal or packing for substantially preventing leakage of high pressure fluids along the reciprocating piston rod or plunger of a reciprocating compressor or pump. This application is a divisional application of the parent application, Ser. No. 579,615, filed Sept. 15, 1966, now Patent No. 3,348,849, issued Oct. 24, 1967. The foregoing patent application was a continuation-in-part of our application, Ser. No. 313,878, filed Oct. 4, 1963, now abandoned.

Conventional segmental-type sealing devices have been used for sealing pump plungers, compressor plungers or piston rods handling fluids at high pressures, for example, 10,000 p.s.i. and higher. These high pressures cause segmental-type seals or packings to be pressed against the reciprocating piston rod or plunger with very high loading forces during operation. To prevent wear and scoring, a lubricating film must be maintained between the seal and the reciprocating member. However, this film is very difficult to maintain in pumps or compressors handling gases and fluids at high pressures. As a result, friction becomes high, causing the life of the sealing device to be relatively short, resulting in increased leakage and frequently, damage to the reciprocating piston rod or plunger.

It is the general object of the present invention to provide an improved sealing device or packing for reciprocating compressors or pumps which overcomes or substantially minimizes the foregoing problems and objections to the prior art, and substantially eliminates leakage of high pressure fluid along a reciprocating piston rod or plunger of a compressor or pump.

Another important object of the present invention is to provide an improved sealing device for reciprocating compressors or pumps which substantially eliminates friction between a reciprocating piston rod or plunger and the sealing device by reducing the pressure of the sealing device on the reciprocating piston rod or plunger to substantially zero, thereby substantially eliminating wear therebetween, and providing a long life for the sealing device.

Another important object of the present invention is to provide an improved sealing device for reciprocating compressors or pumps which permits the utilization of the compressed or pumped fluid (rather than an independent lubrication fluid) to overcome any minimum friction between the sealing device and the reciprocating piston rod or plunger.

The aforesaid objects of the present invention are achieved by providing an improved sealing device for apparatus having a reciprocable rod or member, such as a plunger or piston rod, movable in a cylinder during a pumping stroke to generate a predetermined fluid pressure. The sealing device generally comprises a plurality of annular rings, each having a circular bore of predetermined diameter for receiving the reciprocating member with an initial clearance therebetween, when the fluid pressure is absent. Each annular ring further has an outer circular circumference of predetermined diameter, thereby providing the ring with a predetermined radial thickness and a constant radial cross-sectional area around the entire circumference. Each ring is mounted around the reciprocating member to withstand a differential pressure drop across it and is arranged with its outside circumference and one end face subject to the fluid pressure acting on the ring. Each ring is formed of a material having a predetermined modulus of elasticity and having substantial strength to resist compressive stresses. The predetermined radial thickness and modulus of elasticity of each ring are selected in accordance with the predetermined fluid pressure acting on the ring to allow the fluid pressure to place the ring in compression and, as a result, to elastically reduce the size of the circular bore in the ring to a smaller circular bore surrounding the reciprocating member with almost zero clearance therebetween, without permanently deforming the ring and without creating substantial drag between the ring and the reciprocating member. By having a constant radial cross section around its entire circumference, the compressive stresses created in the ring as a result of the fluid pressure acting on its circumference will be uniform throughout the entire circumference, thereby enabling the ring to remain circular as it is reduced in size by the compressive stresses.

The plurality of rings are provided with a "stepped clearance" in their initial relaxed condition. This means that the clearance of the first ring, nearest to the operating fluid pressure, is substantially different from the clearance of the other rings. This expedient enables the rings to share the sealing load more uniformly than if all of the rings had the same clearance. The plurality of annular rings may be located in one groove of a packing cup or in several grooves of packing cups depending on the requirements.

For a better understanding of the present invention, reference should be made to the accompanying drawings, wherein like reference numerals indicate similar parts throughout the several views and wherein:

FIG. 1 is a fragmentary longitudinal vertical sectional view of a portion of a reciprocating compressor and showing a cylinder, packing cup, flange, plunger and an embodiment of the improved sealing device or packing of the present invention;

FIG. 2 is a section taken along the line 2—2 of FIG. 1;

FIG. 3 is a fragmentary reduced portion of FIG. 1 illustrating the clearance of the seal rings on the reciprocating plunger in their unloaded condition and combined with a graph illustrating the pressure drop across the seal rings;

Figure 4:
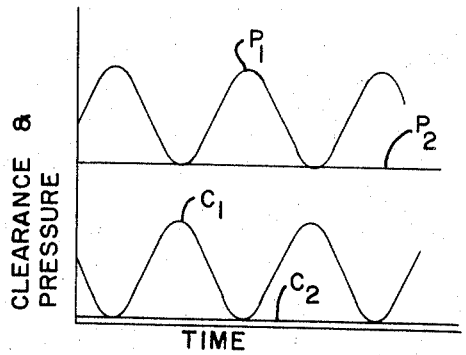
FIG. 4 is a graph or curve illustrating the pressure on the rings in the packing of FIG. 1 and the change in the clearance of the rings on the plunger.

Although the principles of the present invention are broadly applicable to compressors and/or pumps, the present invention is particularly adapted for use in conjunction with compressors and hence it has been so illustrated and will be so described.

With specific reference to the form of the present invention illustrated in the drawings, and referring particularly to FIG. 1, a cylinder of an apparatus, such as a reciprocating compressor, is indicated generally by the reference numeral 10. As shown in FIG. 1, the cylinder 10 is provided with a cylinder bore 12 in which a reciprocable member, such as a plunger 14, is movable in the direction of the arrow during a pumping stroke to generate a fluid pressure.

The sealing device of the present invention includes four (4) annular sealing rings 16, 17, 18 and 19 surrounding the plunger 14 and contained in individual packing cups 22 secured in the cylinder 10 by a flange 24. The flange 24 is secured to the cylinder 10 by conventional means, such as flange bolts 26 and nuts 28.

Each of the rings 16 to 19 includes an internal bore of predetermined diameter which is slightly larger than the diameter of the plunger 14 so that the rings will fit on the plunger with a clearance. Each ring also has an outer circular circumference of predetermined diameter and a constant radial cross-section or thickness, extending between the inside and outside surfaces. As a result of having constant radial thickness, the ring will remain circular when being reduced in diameter by the application of fluid pressure on its outer circumference.

When a high fluid pressure is applied to each ring 16 to 19, the ring will be placed in compression as a result of the outer circumference of the ring having a greater area than its inner bore. These compression stresses will cause the ring to close down or contract on the plunger 14, thus reducing the initial clearance between the ring and plunger 14. The dimensions of the ring are selected in accordance with the fluid pressure and the modulus of elasticity so that under compression, the clearance of the ring will be reduced to almost zero. However, the ring must not pinch the plunger 14 to avoid friction and wear.

Each of the rings 16 to 19 is made of a hard strong material having a minimum Young's modulus of elasticity in the order of $65 \times 10^6$. In some cases, the modulus of elasticity may be as high as $100 \times 10^6$ or higher. Materials meeting this characteristic include tungsten carbide and aluminum-oxide. The modulus of elasticity cannot be lower than $65 \times 10^6$ because rings having a lower modulus will have to be provided with such a large initial clearance that the leakage through the clearance will be too high when the compressor is first started.

In an example compressor, the outside radius of the plunger 14 is 0.7500" (.750"). We have found that a single sealing ring of the type described will produce a differential pressure drop of 10,000 p.s.i., or more. Such a sealing ring will reduce the pressure of a compressed fluid from, say, about 75,000 p.s.i. to about 65,000 p.s.i. For this service, material like cemented tungsten carbide having a modulus of elasticity of about $100 \times 10^6$ is preferred. If the sealing ring is installed with approximately .0001" initial radial clearance, the inside radius of the bore of the sealing ring will be .7501" and the ring will deform elastically under pressure until the radial clearance becomes almost zero. The radial thickness of the sealing ring is .4059" where the outside radius of the ring is 1.1560".

Figure 5:
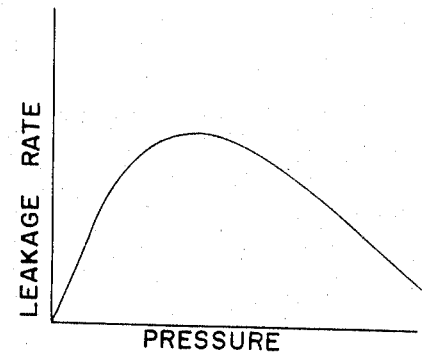
FIG. 5 is another curve illustrating the variation in leakage past a set of rings with the rise in operating pressure on the rings during the starting of the compressor.

FIG. 5 illustrates the change in leakage through a ring 16 to 19 during the starting of the compressor. As the pressure rises initially, the leakage also rises along a steep curve. As the pressure continues to rise, the leakage curve peaks and starts gradually downward until reaching a minimum value. Preferably, the operating pressure of the compressor should be in the region where the leakage is near a minimum. It is assumed that the peak of the leakage curve occurs when the clearance controls the rate of leakage more than the pressure. Normally, the peak of the leakage curve occurs far below the operating pressure of the compressor.

Looking at FIG. 3, the ring 16 nearest to the operating pressure is subject to a fluctuating or cyclic pressure due to the varying pressure in the compressor chamber 12. Looking at FIG. 4, the fluctuating pressure is represented by the curve $P_1$. As a result of the fluctuating pressure $P_1$, the clearance between the first ring 16 and the plunger 14 also fluctuates 180 degrees out of phase with the pressure $P_1$, as denoted by the curve $C_1$ in FIG. 4. In the graph of FIG. 3, the solid line curve represents the pressure when $P_1$ is at its highest value and the dotted line curve represents the pressures when $P_1$ is at its lowest value.

The pressures on the second, third and fourth seal rings 17, 18 and 19 remain substantially constant in contrast to the pressure $P_1$ on the first ring 16. The straight line $P_2$ in FIG. 4 denotes the pressure acting on the second ring 17. As a result of the substantially constant pressure $P_2$ on the ring 17, the clearance $C_2$ of the ring 17 remains constant, as denoted on FIG. 4 by the straight line $C_2$. Since the clearance $C_1$ of the first ring 16 fluctuates, the first ring must have a greater initial clearance in order for it to fluctuate in clearance without pinching the plunger 14 and in order for it to withstand a greater differential pressure than each of the remaining rings 17 to 19. This difference in initial clearance between the first ring 16 and the remaining rings 17 to 19 is called the "stepped clearance" concept. This concept is shown in FIG. 3 as related to multi-groove packing.

Figure 7:
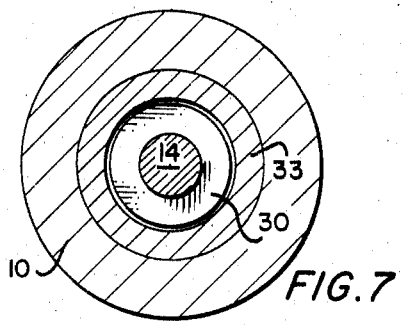
FIG. 7 is a section taken on line 7—7 of FIG. 6.
Figure 6:
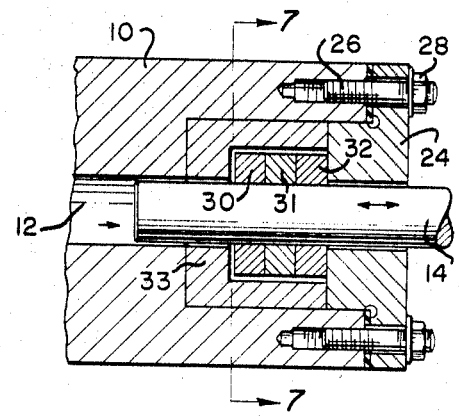
FIG. 6 is a fragmentary sectional view similar to FIG. 1 of a second embodiment of packing.
Figure 8:
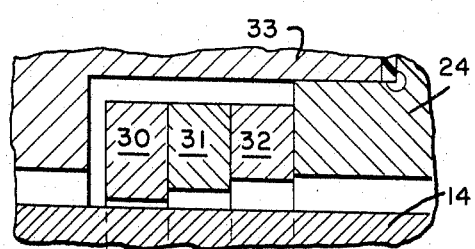
FIG. 8 is a combined fragmentary section and graph similar to FIG. 3 illustrating the stepped clearances and pressure drop across the packing rings of the second embodiment.
Figure 8:
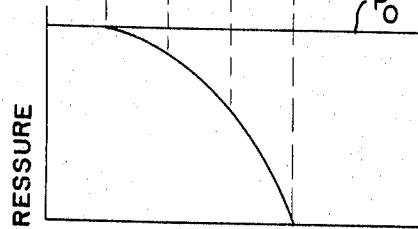

In the second embodiment shown in FIGS. 6 to 8, three seals rings 30, 31 and 32 are housed together in a single cup 33. The rings 30 to 32 are substantially identical to the rings 16 to 19 in the FIG. 1 embodiment.

The second embodiment also utilizes the "stepped clearance" concept in a different way. As shown in FIG. 8, the first ring 30, nearest to the operating pressure, is given a smaller clearance than the second ring 31, while the second ring 31 is provided with a smaller clearance than the third and last ring 32. The reason for this arrangement is explained by noting that the circumferences of all three rings 30 to 32 are subject to the operating pressure while the pressure is lower in the bores of the second and third rings 31 and 32. As a result, the differential pressure drop between the outer circumferences and inner bore is greater in the second ring 31 than the first ring 30, and greater in the third ring 32 than the second ring 31. Due to this progressively greater pressure drop in the later rings, the clearance in each later ring must be larger than in the previous ring to insure that each ring will close down to substantially the same clearance when under pressure.

It will be recognized by those skilled in the art that the objects of the present invention have been achieved by providing an improved sealing device for reciprocating compressors and/or pumps, which improved sealing device substantially eliminates friction between the reciprocating piston rod or plunger and the sealing device by reducing the pressure of the sealing device on the reciprocating piston rod or plunger to substantially zero thereby substantially eliminating wear therebetween and providing a long sealing device life. The improved sealing device permits use of the compressed or pumped fluid to overcome any minimum friction between the sealing device and the reciprocating plunger or piston.

While in accordance with the patent statutes, two embodiments of the present invention have been illustrated and described in detail, it is to be particularly understood that the invention is not limited thereto or thereby. Other variations would include multiple rings in each of multiple grooves.

Having thus described our invention, we claim:

1. In an apparatus having a reciprocating member having an outside cylindrical circumference moving in a cylinder and subject to a predetermined fluid pressure of 10,000 p.s.i. or higher, a sealing device comprising:

a packing body including a bore slidably receiving said reciprocating member and having an annular groove formed on the interior of said bore;

a plurality of annular rings mounted around said reciprocating member in said groove in said packing body;

each annular ring having a circular bore of predetermined diameter to receive said reciprocating member with a predetermined initial clearance therebetween, when said fluid pressure is absent, and further having an outer circular circumference of predetermined diameter thereby providing said ring with a predetermined radial thickness, and a constant radial cross-sectional area around its entire circumference;

said plurality of rings being mounted around said reciprocating member to withstand a differential pressure drop across them with a first ring being located closest to said predetermined fluid pressure and being arranged with its outside circumference and one end face subject to said predetermined fluid pressure;

each ring being formed of a metallic impervious material having a predetermined modulus of elasticity of at least $65 \times 10^6$ and having substantial strength to resist stresses;

said predetermined radial thickness and predetermined modulus of elasticity being selected in accordance with said predetermined fluid pressure to allow said fluid pressure to place each ring in compression and, as a result, to elastically reduce the size of said circular bore to a smaller circular bore surrounding said reciprocating member with almost zero clearance therebetween without premanently deforming said ring and without creating frictional drag between said ring and said reciprocating member; and said predetermined initial clearance between said first ring and said rod being substantially less than the predetermined initial clearance between the remainder of said rings and said rod.

2. The sealing device of claim 1 wherein:

each of said remaining rings has a greater predetermined initial clearance than the ring immediately preceding it, proceeding from said first ring.

References Cited

UNITED STATES PATENTS 1,736,646  11/1929  Brammer _____ 277—125 X
2,456,356  12/1948  Aber _____ 277—176
3,050,311  8/1962   Mikell _____ 277—157

FOREIGN PATENTS 821,749  11/1951.  Germany.

SAMUEL ROTHBERG, *Primary Examiner.*